UNITED STATES PATENT OFFICE.

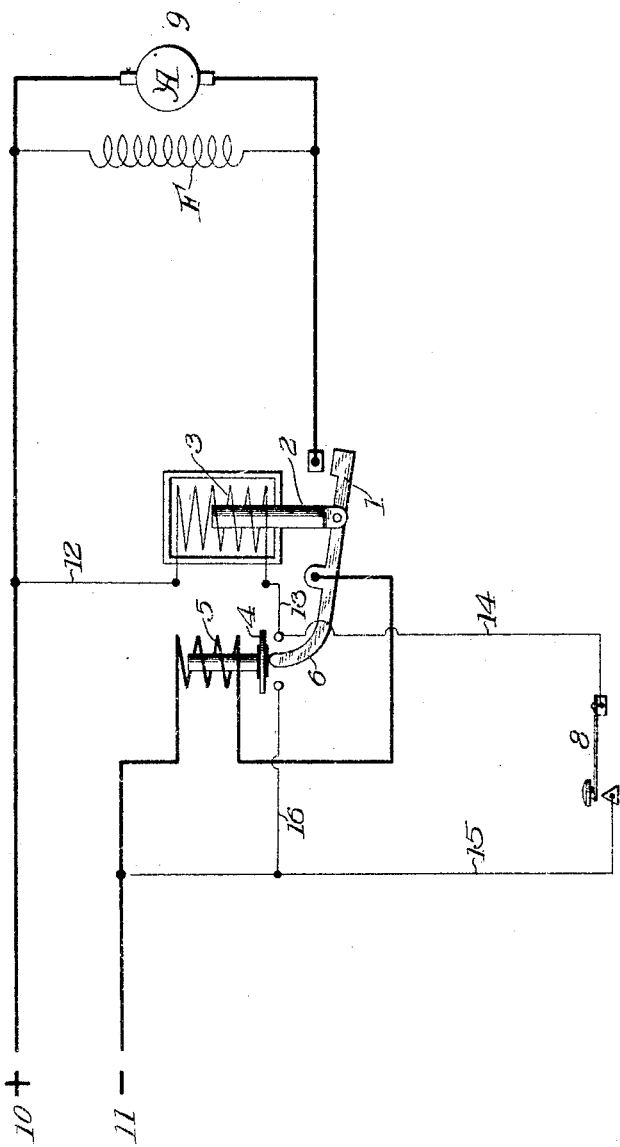

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

CIRCUIT-BREAKER.

957,334.  Specification of Letters Patent.  Patented May 10, 1910.

Application filed July 1, 1909. Serial No. 505,318.

*To all whom it may concern:*

Be it known that I, CLARK T. HENDERSON, a citizen of the United States, residing at Milwaukee, in the county of Milwaukee and State of Wisconsin, have invented new and useful Improvements in Circuit-Breakers, of which the following is a full, clear, concise, and exact description, reference being had to the accompanying drawing, forming a part of this specification.

My invention relates to improvements in circuit breakers.

My invention relates more particularly to circuit breakers comprising a circuit controlling switch having an electroresponsive winding for setting and maintaining the same in closed position, and an auxiliary switch responsive to abnormal conditions for causing the deënergization of said winding to release the circuit controlling switch. In such devices upon the opening of the circuit controlling switch, the auxiliary switch tends to return to initial position, thereby tending to again energize the operating winding of the circuit controlling switch to reset the same, regardless of whether or not abnormal conditions continue to exist.

It is, therefore, the object of my invention to provide means for maintaining the circuit breaker open after the auxiliary switch has once responded, until reset in the usual way by the operator.

According to the preferred form of my invention, I provide a mechanical interlock between the circuit controlling switch and the auxiliary switch, whereby it will be impossible for the auxiliary switch to return to initial position until the circuit controlling switch has again been closed.

For the purpose of more fully disclosing my invention, I shall describe the device illustrated in the accompanying drawing. The drawing also shows one circuit arrangement for the device.

It should be understood that my invention is not limited to the particular form of device illustrated, but is susceptible of various modifications.

The device which I have shown includes a pivoted switch 1 connected to the plunger 2 of a solenoid winding 3. The winding 3, when energized, is adapted to close the switch 1 and to maintain the same in closed position. In addition to the switch 1, the device includes a switch 4 provided with an operating winding 5. As illustrated, the switch 4 is of the overload type. For the purpose of illustration, I have shown the interlock between the switch 1 and the switch 4 as merely comprising an extension 6 provided on the switch 1. This extension serves to maintain the switch 4 open so long as the switch 1 remains in open position. The purpose of this arrangement will be hereinafter more fully set forth. The circuit of the winding 3 may be controlled in any desired manner. For the purpose of illustration, I have shown a switch 8 for controlling said winding.

While my invention may be used in connection with various forms of translating devices, in the present instance I have shown the same used in connection with an electric motor 9. As illustrated, the motor 9 is provided with an armature A and a shunt field winding F. Current is supplied to the motor from supply lines 10 and 11. The operating winding of the switch 4 is shown as connected in series with the motor and is, consequently, responsive to the motor current. It will be understood that the winding 5 is adjusted to respond only upon an excessive surge of current through the motor.

To close the switch 1, it is necessary to actuate the switch 8. This completes a circuit from main line 10 by conductor 12, through the operating winding 3 on the switch 1, by conductors 13 and 14, through the switch 8, and by conductor 15 to main line 11. This causes the energization of the winding 3, which thereupon responds and closes the switch 1. Closure of the switch 1 completes the motor circuit. The motor circuit is perfectly clear, and, therefore, need not be traced. Upon closure of the switch 1 the extension 6 is withdrawn from engagement with the overload switch 4, thereby permitting said overload switch to close. Closure of the overload switch 4 completes a maintaining circuit in shunt with the switch 8. Said maintaining circuit may be traced from conductor 13, through the switch 4 and by conductors 16 and 15 to main line 11. Upon establishment of this maintaining circuit, the switch 8 may be opened without interrupting the circuit of the winding 3.

In practice, I prefer to provide the switch 8 of a type tending to stand in open position, thereby rendering it impossible for the operator to leave said switch in closed position. Of course, various other means might be provided for insuring the opening of the energizing circuit other than the particular form of switch illustrated.

The winding 3 will remain energized, thereby maintaining the switch 1 closed as long as normal conditions prevail. However, if at any time the motor current becomes excessive, the winding 5 will respond, thereby opening the switch 4. This, of course, interrupts the maintaining circuit of the winding 3, and, consequently, deënergizes said winding. The deënergization of the winding 3 causes the switch 1 to open, thereby again moving the extension 6 into engagement with the overload switch 4. This, of course, prevents reclosure of the overload switch. With this arrangement, it will be seen that after the circuit breaker has once been opened, it cannot again be closed until the operator recloses the control switch 8. Of course, the overload device might be arranged to deënergize the maintaining winding of the circuit breaker in other ways than that illustrated. However, one of the particular advantages of the device illustrated is that when the circuit breaker opens, all control circuits are opened and maintained open until the circuit breaker is reset. Consequently there is no needless expenditure of current.

Having thus described my invention, what I claim and desire to secure by Letters Patent is—

1. In a circuit breaker, in combination, an electro-responsive circuit controlling switch, a switch responsive to abnormal conditions for causing the deënergization of said first mentioned switch, and an interlock between said switches for preventing the return of said second mentioned switch to initial position while said first mentioned switch remains open.

2. In a circuit breaker, in combination, an electro-responsive circuit controlling switch, a switch responsive to abnormal conditions for causing the deënergization of said first mentioned switch, an interlock between said switches necessitating the reclosure of said first mentioned switch before said second mentioned switch can return to initial position, and means independent of said second mentioned switch for causing said first mentioned switch to respond.

3. In a circuit breaker, in combination, an electroresponsive circuit controlling switch, a switch responsive to abnormal conditions for causing the deënergization of said first mentioned switch, an interlock between said switches necessitating the reclosure of said first mentioned switch before said second mentioned switch can return to initial position, and a normally open energizing circuit for said first mentioned switch independent of said second mentioned switch.

4. In a circuit breaker, in combination, an electroresponsive circuit controlling switch, a normally open energizing circuit therefor, a maintaining circuit for said switch, and a switch responsive to abnormal conditions for opening said maintaining circuit to cause said first mentioned switch to open, said first mentioned switch when open being arranged to prevent reclosure of said maintaining circuit.

5. In a circuit breaker, in combination, an electroresponsive circuit controlling switch, a normally open energizing circuit therefor, a maintaining circuit for said switch, and a switch responsive to abnormal conditions for opening said maintaining circuit to cause said first mentioned switch to open, said first mentioned switch when open being adapted to maintain said second mentioned switch in open position.

6. In a circuit breaker, in combination, an electroresponsive setting and maintaining winding, an overload switch adapted to respond to deënergize said winding, and means for preventing the return of said overload switch to initial position until the circuit breaker is reset.

7. In a circuit breaker, in combination, an electroresponsive setting and maintaining winding, an overload switch adapted to respond to open the circuit of said winding, means for maintaining said overload switch in open position until the circuit breaker is reset, and a normally open energizing circuit for said winding independent of said overload switch.

8. In a circuit breaker, in combination, an electroresponsive circuit controlling switch, an overload switch adapted to respond to deënergize said controlling switch, and a mechanical connection between said switches for preventing the return of said overload switch to initial position while said circuit controlling switch is open.

9. In a circuit breaker, in combination, a pivoted circuit controlling switch having an electroresponsive operating winding, and an overload switch adapted to respond to open the circuit of said winding, said controlling switch having a portion adapted to engage said overload switch and maintain the same in open position until said controlling switch is again closed.

10. In a circuit breaker, in combination, a pivoted circuit controlling switch, an electroresponsive operating winding therefor, said winding having a normally open energizing circuit and a maintaining circuit and an overload switch adapted to respond to open said maintaining circuit, said controlling switch having a portion engaging said overload switch and adapted to prevent closure of said overload switch except when said controlling switch is closed.

In witness whereof, I have hereunto subscribed my name in the presence of two witnesses.

CLARK T. HENDERSON.

Witnesses:
F. R. BACON,
F. S. WILHOIT.